(12) United States Patent
Bussis (10) Patent No.: US 8,590,446 B1
(45) Date of Patent: Nov. 26, 2013

(54) FOOD COOKING APPARATUS

(76) Inventor: Mark John Bussis, Hudsonville, MI (US)

( * ) Notice: Subject to any disclaimer, the term of this patent is extended or adjusted under 35 U.S.C. 154(b) by 562 days.

(21) Appl. No.: 12/584,174

(22) Filed: Sep. 1, 2009

(51) Int. Cl.
A22C 7/00 (2006.01)

(52) U.S. Cl.
USPC .............................................. 99/427; 99/419

(58) Field of Classification Search
USPC ........... 99/419, 441, 426, 427, 421 A, 421 H, 99/275, 330, 375, 345, 357, 339; 219/385, 219/400, 403, 411, 412, 438, 450.1, 401, 219/524; 126/25 R, 41 R, 273.5, 275 E, 273 R
See application file for complete search history.

(56) References Cited

U.S. PATENT DOCUMENTS

| | | |
|---|---|---|
| 99,971 A | 2/1870 | Taylor et al. |
| D3,840 S | 12/1870 | Fawcett et al. |
| 604,965 A | 5/1898 | Cartwright |
| 749,414 A | 1/1904 | Washington |
| 950,043 A | 2/1910 | Gierding |
| 1,397,453 A | 11/1921 | Rekar |
| 1,398,621 A | 11/1921 | Braddick |
| 1,423,612 A | 7/1922 | Jewett |
| 1,748,741 A | 2/1930 | Tanaki |
| 1,754,968 A | 4/1930 | Smith |
| 1,814,547 A | 7/1931 | Edwards |
| D95,309 S | 4/1935 | Bennett |
| 2,041,369 A | 3/1936 | Pickett |
| 2,136,658 A | 11/1938 | Westberg et al. |
| 2,173,024 A | 9/1939 | Park |
| 2,189,047 A | 2/1940 | Tolen |
| 2,191,226 A | 2/1940 | Clem |
| 2,317,388 A | 4/1943 | Lako, Jr. |
| 2,479,324 A | 8/1949 | Dawson |
| 2,479,533 A | 8/1949 | Woodbury |
| 2,487,651 A | 11/1949 | Gudmundsen |
| D156,731 S | 1/1950 | Hobbs |
| 2,514,281 A | 7/1950 | Hobbs |
| 2,522,223 A | 9/1950 | Hardin et al. |
| 2,552,223 A | 9/1950 | Hardin et al. |
| 2,535,548 A | 12/1950 | Porter |
| D161,756 S | 1/1951 | Hunter |
| 2,545,121 A | 3/1951 | Szopa |
| 2,649,042 A | 8/1953 | Wickman |
| 2,706,446 A | 4/1955 | Lockey |
| 2,804,819 A | 9/1957 | Whealton |
| 2,827,846 A | 3/1958 | Karkling |

(Continued)

FOREIGN PATENT DOCUMENTS

| | | |
|---|---|---|
| BE | 526739 | 3/1954 |
| CH | 420534 | 3/1967 |

*Primary Examiner* — Henry Yuen
*Assistant Examiner* — Phuong Nguyen
(74) *Attorney, Agent, or Firm* — King & Partners, PLC (57) ABSTRACT

A food cooking apparatus for converting dough into a cooked pastry product over an open flame or coals which is configured to at least one of substantially blanket a hot dog and/or retain pudding, generally including: a tubular body, wherein the tubular body includes an outer surface and an inner surface; a first end proximate to a user, wherein the first end includes an opening which is adapted to releasably receive a substrate for separating a user from an open flame or coals; and a second end distal to a user, wherein the second end includes at least one of a plurality of tabs, wherein the plurality of tabs are bent to collectively form at least one optional venting aperture, a washer, an end-cap, and combinations thereof.

7 Claims, 7 Drawing Sheets

(56) References Cited

U.S. PATENT DOCUMENTS

| | | | |
|---|---|---|---|
| 2,838,990 A | 6/1958 | Stiburski | |
| 2,864,163 A | 12/1958 | Boruvka | |
| 2,877,547 A | 3/1959 | Feaster | |
| 2,935,982 A | 5/1960 | Otis | |
| 2,938,450 A | 5/1960 | Carpenter et al. | |
| 2,938,988 A | 5/1960 | McCutcheon et al. | |
| 2,940,439 A | 6/1960 | Bartels et al. | |
| 2,946,276 A | 7/1960 | Stone | |
| 2,960,979 A | 11/1960 | Stonez | |
| 2,977,953 A | 4/1961 | Dowdy | |
| 3,013,551 A | 12/1961 | Savino | |
| 3,045,660 A | 7/1962 | Manely et al. | |
| 3,064,933 A | 11/1962 | Brasty | |
| 3,079,119 A | 2/1963 | Brooks | |
| 3,162,113 A | 12/1964 | Tallaksen | |
| 3,181,453 A | 5/1965 | Moran | |
| 3,195,531 A | 7/1965 | Groff | |
| 3,260,465 A * | 7/1966 | Grumbein | 239/430 |
| 3,358,952 A | 12/1967 | Burns | |
| 3,381,824 A | 5/1968 | Blumenscheiu | |
| 3,410,457 A | 11/1968 | Brown | |
| 3,483,816 A | 12/1969 | Lomandi | |
| 3,628,819 A | 12/1971 | Fowler | |
| 3,632,021 A * | 1/1972 | MacManus | 222/95 |
| 3,664,794 A * | 5/1972 | Wilson | 425/192 R |
| 3,745,910 A | 7/1973 | Delamater | |
| 3,802,330 A | 4/1974 | Graziani | |
| 3,906,632 A | 9/1975 | Oppenheimer | |
| 3,927,609 A | 12/1975 | Scott | |
| 3,931,758 A | 1/1976 | Blake | |
| 3,946,653 A | 3/1976 | Pugh | |
| D244,903 S | 7/1977 | Hildebrand | |
| 4,083,354 A | 4/1978 | Claire et al. | |
| 4,090,438 A | 5/1978 | Luna | |
| 4,094,296 A | 6/1978 | Beagley | |
| 4,176,592 A | 12/1979 | Doyle, Jr. | |
| 4,258,617 A | 3/1981 | Akwei | |
| 4,332,409 A | 6/1982 | Stachowicz | |
| 4,355,569 A | 10/1982 | Sage | |
| 4,370,920 A | 2/1983 | Henriques et al. | |
| 4,380,192 A | 4/1983 | Doren | |
| 4,436,024 A | 3/1984 | Arden et al. | |
| 4,446,777 A | 5/1984 | Grigorenko | |
| 4,517,885 A | 5/1985 | Thompson | |
| 4,539,751 A | 9/1985 | Chan | |
| 4,553,525 A | 11/1985 | Ruble | |
| 4,555,986 A | 12/1985 | Eisenberg | |
| 4,612,851 A | 9/1986 | McManus | |
| 4,625,634 A | 12/1986 | Kruper | |
| 4,691,626 A | 9/1987 | Shih-Cheng | |
| 4,982,657 A | 1/1991 | Ghenic | |
| 4,985,607 A | 1/1991 | Oya | |
| 5,117,558 A | 6/1992 | Hull | |
| 5,206,998 A | 5/1993 | Oriente et al. | |
| 5,238,445 A | 8/1993 | Green | |
| 5,307,797 A | 5/1994 | Kleefeld | |
| 5,310,381 A | 5/1994 | Green | |
| 5,323,691 A * | 6/1994 | Reese et al. | 99/275 |
| 5,355,778 A | 10/1994 | Mayfield et al. | |
| 5,370,433 A | 12/1994 | Yost | |
| D361,699 S | 8/1995 | McHugh | |
| D377,888 S | 2/1997 | Griffin | |
| 5,628,244 A | 5/1997 | Holliday | |
| 5,749,286 A | 5/1998 | Payette | |
| 5,771,600 A * | 6/1998 | Romanow | 34/63 |
| 5,944,009 A | 8/1999 | Scheller | |
| 6,085,642 A | 7/2000 | Terry | |
| 6,220,152 B1* | 4/2001 | Baldwin et al. | 99/427 |
| 6,234,162 B1 | 5/2001 | Wenker | |
| 6,265,004 B1* | 7/2001 | Cagle | 426/132 |
| 6,701,827 B1 | 3/2004 | Longbrake | |
| 2006/0150963 A1 | 7/2006 | Barron | |
| 2007/0084353 A1 | 4/2007 | Hankinson | |

\* cited by examiner

FOOD COOKING APPARATUS

CROSS-REFERENCE TO RELATED APPLICATION(S)

Not Applicable

BACKGROUND OF THE INVENTION

1. Field of the Invention

The present invention relates in general to a food cooking apparatus and, more particularly, to food cooking apparatuses which are adapted to cook, for example, dough into a bread or pastry product near an open camp fire or other heat source.

2. Background Art

Food cooking apparatuses have been known in the art for years, and are the subject of numerous patents, including: U.S. Pat. No. 4,332,409 entitled "Combination Fork," U.S. Pat. No. 5,307,797 entitled "Portable Grill," U.S. Pat. No. 5,775,207 entitled "Safety Fork for Use Over Camp Fires and Grills," U.S. Pat. No. 6,234,162 B1 entitled "Open Fire Cooking Apparatus," U.S. Pat. No. 6,701,827 B1 entitled "Rotary Food Cooking Apparatus," United States Patent Application Publication Number 2006/0150963 A1 entitled "Camping Tube Grill," and United States Patent Application Publication Number 2007/0084353 A1 entitled "Food Roasting Apparatus"—all of which are hereby incorporated herein by reference in their entirety including the references cited therein.

U.S. Pat. No. 4,332,409 appears to disclose a combination fork which has a handle at one end of an elongated shaft, and tines at the other end of the shaft for cooking food morsels over an open source of heat. The handle of the cooking fork includes at the butt end thereof an open bore. A smaller fork is adapted to be force-fit into the bore. The smaller fork may be extracted from the bore to remove the cooked food morsels from the tines of the larger fork. In one disclosed embodiment, the bore in the larger fork is generally cylindrical and extends substantially the length of the handle. The smaller fork is inserted into the bore with the tines first, and the handle of the smaller fork has a small conical taper enlarging toward the butt end, whereby the force-fit inside of the bore of the larger fork is accomplished by pushing the small fork into the bore to a point where the diameter of the tapered handle equals or slightly exceeds the diameter of the mouth of the bore.

U.S. Pat. No. 5,307,797 appears to disclose a portable outdoor grill which includes a round, smooth stake having a T-shaped upper end to facilitate insertion and removal from the ground. An E-shaped double-hook having at each end a hook making contact with the post at two separated points, mounts on its external side a sleeve that slidably receives a horizontal arm. One end of the arm is for mounting a cooking utensil over a source of heat, and the other end mounts a wooden handle. The cooking utensil may be a wire basket having a wire lid allowing cooking of the other side of the food on rotation of the basket; two lid levers embracing the arm preclude opening of the lid on rotation of the basket. The basket may be replaced by a Y-shaped bar whose branches have arcuate shapes providing three-point support for a range of differently sized cookware.

U.S. Pat. No. 5,775,207 appears to disclose a safety fork for roasting hot dogs and marshmallows over an open fire. The fork has an elongated shaft with a handle at one end and a hook at the other. The hook is formed from a pair of tines extending forwardly, then bending rearwardly forming a bight defining a food holding area adapted for receipt of one or more hot dogs or marshmallows and finally extending rearwardly, the tines having a plane of symmetry passing through the shaft. Forwardly and rearwardly extending portions of tines are in stacked planes so that the food holding area continues for a distance along the forwardly extending portion of the tines.

U.S. Pat. No. 6,234,162 B1 appears to disclose an apparatus for cooking food items over an open fire which allows a cook to turn the food and adjust the position of the food over the fire while maintaining a safe distance from the fire. The apparatus is constructed and arranged to allow hands-free operation or, if desired, allow a cook to continually control the position of the food over the fire using one hand. This is accomplished using a telescopic handle and two supports.

U.S. Pat. No. 6,701,827 B1 appears to disclose a rotary food cooking apparatus for food being roasted over an open heat source such as a campfire. The device appears to be adaptable for holding other food items, such as marshmallows, by the use of an accessory holder.

United States Patent Application Publication Number 2006/0150963 A1 appears to disclose a camping tube grill that is assembled to create a grilling surface over a fire pit and may be collapsed into a compact carrying case. The camping tube grill includes two tubular rails, several grill rods, a pair of U-shaped spacing bars, and a storage case into which the rails, rods and bars are placed for storage and transport. The grill rods and spacing bars are inserted within holes defined in the rails, forming a grilling surface. One rail has a greater diameter than the other rail so that when the camping tube grill is disassembled, the smaller rail is able to fit within the larger rail. The spacing bars and grill rods are then inserted within the smaller rail, and the assembly is packed together into the compact carrying case.

United States Patent Application Publication Number 2007/0084353 A1 appears to disclose a food roasting apparatus which includes an elongated rigid rod with opposite first and second ends, a handle attached to the first end, and a basket attached to the second end. The rod defines a rod longitudinal axis, the basket defines a basket longitudinal axis, and the rod includes an offset portion such that the rod longitudinal axis is inline with the basket longitudinal axis. Since the rod longitudinal axis is inline with the basket longitudinal axis, the basket does not rise or fall when rotated with the rod. The food roasting apparatus may include a sleeve coupled to the rod and a stand that releasably captures the sleeve and supports the rod. The apparatus includes an open-ended basket and a basket that easily and safely opens and closes. When cool, the basket can be removed from the rod for transport or cleaning.

While the above-identified patents and publications do appear to provide food cooking apparatuses, their configurations remain non-desirous and/or problematic inasmuch as, among other things, none of the above-identified apparatuses appear to be configured to effectively enable a user to convert dough into a cooked pastry product over an open flame or coals which is suitable for association with, for example, a bratwurst, frankfurter, hot dog, sausage, wiener, pudding, sugar, cinnamon etcetera—among other things.

It is therefore an object of the present invention to provide a food cooking apparatus, which, among other things, remedies the aforementioned detriments and/or complications associated with the use of the above-identified, conventional food cooking apparatuses. It is further therefore an object of the present invention to provide a food cooking apparatus, which, among other things is relatively easy to clean (e.g., compared to a wooden dowel), small and easy to store while camping, and/or facilitates reasonably good heat transfer.

These and other objects of the present invention will become apparent in light of the present specification, claims, and drawings.

SUMMARY OF THE INVENTION

In one embodiment, the present invention is directed to a food cooking apparatus for converting dough into a cooked pastry product (e.g., a pig-in-the-blanket, a generally hollowed wrap, roll, bun, croissant, etcetera) over an open flame or coals, or other energy/heat source, which is configured to at least substantially blanket (e.g., wrap, surround, encase, retain, cover, etcetera) a hot dog (e.g., a bratwurst, frankfurter, sausage, wiener, etcetera), pudding, jelly, sugar, cinnamon, etcetera, comprising a tubular body, wherein the tubular body comprises: (a) an outer surface; (b) an inner surface; (c) a first end proximate to a user, wherein the first end comprises an opening which is adapted to releasably receive a substrate (e.g., a rod, shaft, branch, stick, twig, etcetera) for separating/isolating a user from an open flame or coals; and (d) a second end distal to a user, wherein the second end comprises at least one of a plurality of tabs, wherein the plurality of tabs are bent to collectively form one or more optional venting aperture(s); a washer; an end cap; and combinations thereof.

In a preferred embodiment of the present invention, the tubular body is optionally substantially cylindrical, fabricated from a food grade material and/or associated with generally non-stick polytetrafluoroethylene.

In another preferred embodiment of the present invention, the first end of the tubular body comprises an annular opening.

In yet another preferred embodiment of the present invention, the first end of the tubular body further comprises one or more venting aperture(s). In this embodiment, the venting apertures may comprise four circular venting apertures which are circumferentially evenly spaced apart from one another.

In another aspect of the present invention, the first end of the tubular body preferably further comprises means for releasably securing a substrate to the food cooking apparatus, such as, for example, a threaded or non-threaded aperture which is adapted to receive a nail, rod, fastener, and/or screw for securing the substrate to the food cooking apparatus.

In a preferred embodiment of the present invention, the second end comprises four tabs which are bent to collectively form at least four venting apertures that are preferably circumferentially evenly spaced apart from one another.

In another preferred embodiment of the present invention, the second end comprises four tabs which are bent to collectively form five venting apertures, wherein four venting apertures are circumferentially evenly spaced apart from one another, and a fifth venting aperture is collectively formed by the ends of the four tabs. In this embodiment, the fifth venting aperture may comprise a square aperture. Additionally, the tabs which form the fifth venting aperture may emanate substantially perpendicular to the outer surface of the tubular body.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

In accordance with the present invention, the food cooking apparatuses disclosed herein facilitate converting dough into a cooked pastry product over open flame or coals (or other energy/heat sources) which are configured to at least substantially blanket a hot dog, and/or retain pudding, sugar, cinnamon, etcetera. It will be understood that regardless of their ordinary meanings: the term "cooked pastry product" will be defined herein to include cooked flour based products, such as pig-in-the-blankets, generally hollowed wraps, rolls, buns, croissants, etcetera; the term "blanket" will be defined herein to include wrapped, surrounded, encased, retained, covered, etcetera; the term "hot dog" will be defined herein to include bratwursts, frankfurters, sausages, wieners, etcetera; and the term "substrate" will be defined herein to include a rod, shaft, branch, stick, twig, etcetera.

Figure 1:
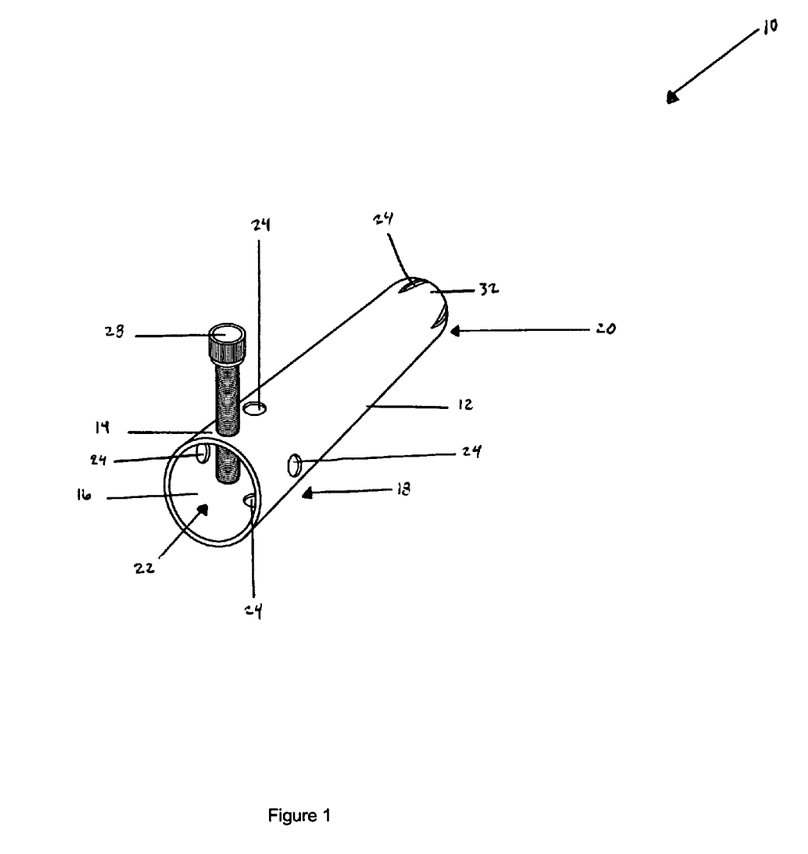
FIG. 1 of the drawings is a perspective view of a food cooking apparatus showing, among other things, a first end proximate to a user.

Referring now to the collective drawings (i.e., FIGS. 1-5), and to FIG. 1 in particular, a perspective view of a first embodiment of food cooking apparatus 10 is shown which generally comprises tubular body 12 having outer surface 14, inner surface 16, first end 18, and second end 20. It will be understood that food cooking apparatus 10 may be fabricated from a unitary piece of material or, alternatively, from a plurality of pieces. It will be further understood that FIGS. 1-5 are merely representations of food cooking apparatus 10. As such, some of the components may be distorted from their actual scale for pictorial clarity and/or image enhancement.

In one, preferred embodiment of the present invention, tubular body 12 is substantially cylindrical, and/or preferably fabricated from metals, non-metals, ceramics, wood, plastics and/or a food grade material, such as stainless steel or other acceptable metals, glass, etcetera. Additionally, at least a portion or all of outer surface 14 of tubular body 12 may be associated with polytetrafluoroethylene or any other non-stick compound acceptable in the food products industry.

Figure 3A:
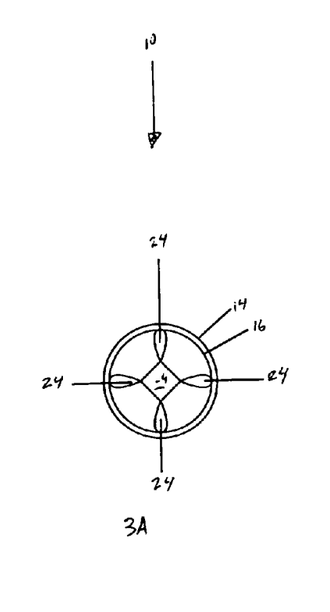
FIG. 3A of the drawings is an end view of a food cooking apparatus showing, among other things, a first end proximate to a user.
Figure 5:
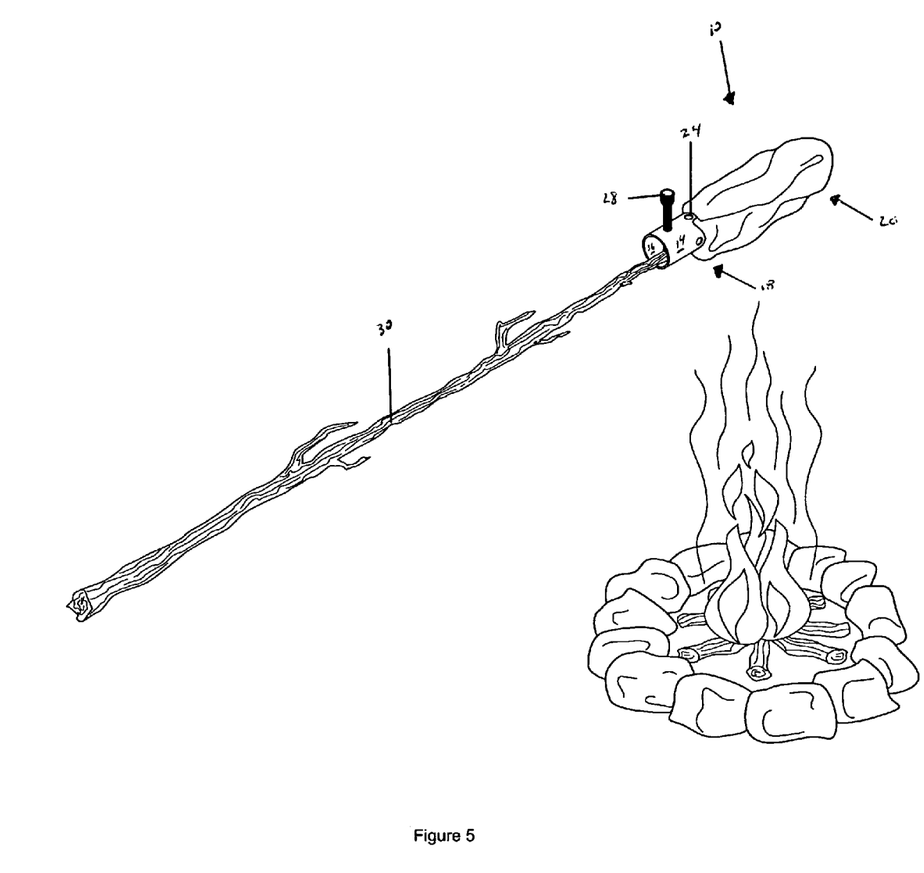
FIG. 5 of the drawings is a perspective view of a food cooking apparatus attached to a substrate (e.g., a tree branch) in proximity to a camp fire.

As is best shown in FIGS. 1, 3A, and 5, first end 18 of body 12 is designed to be proximate to a user and comprises opening 22 which is adapted to releasably receive a substrate for separating and/or isolating a user from open flames and/or hot coals, and preferably comprises an annular opening. First end 18 preferably comprises one or more venting apertures 24.

Referring now to FIGS. 1, 2A-C, and 4, optional venting apertures 24 may include apertures which are circumferentially evenly spaced apart from one another.

Referring now to FIGS. 1, 2A-C, 4, and 5, first end 18 of tubular body 12 may further comprise means for releasably securing a substrate to food cooking apparatus 10, such as threaded aperture 26 which is adapted to receive threaded fastener 28 for securing substrate 30 (See FIG. 5) to food cooking apparatus 10. It will be understood that a non-threaded aperture may also or alternatively be associated with tubular body 12.

Figure 3B:
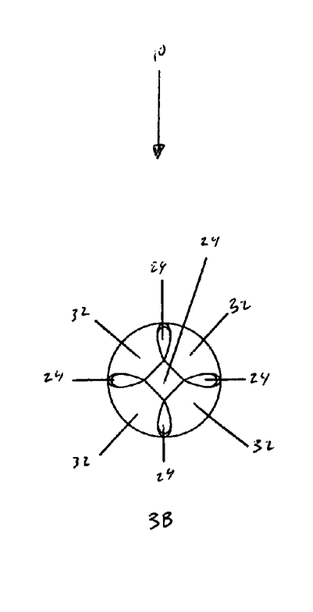
FIG. 3B of the drawings is an end view of a food cooking apparatus showing, among other things, a second end distal to a user.
Figure 4:
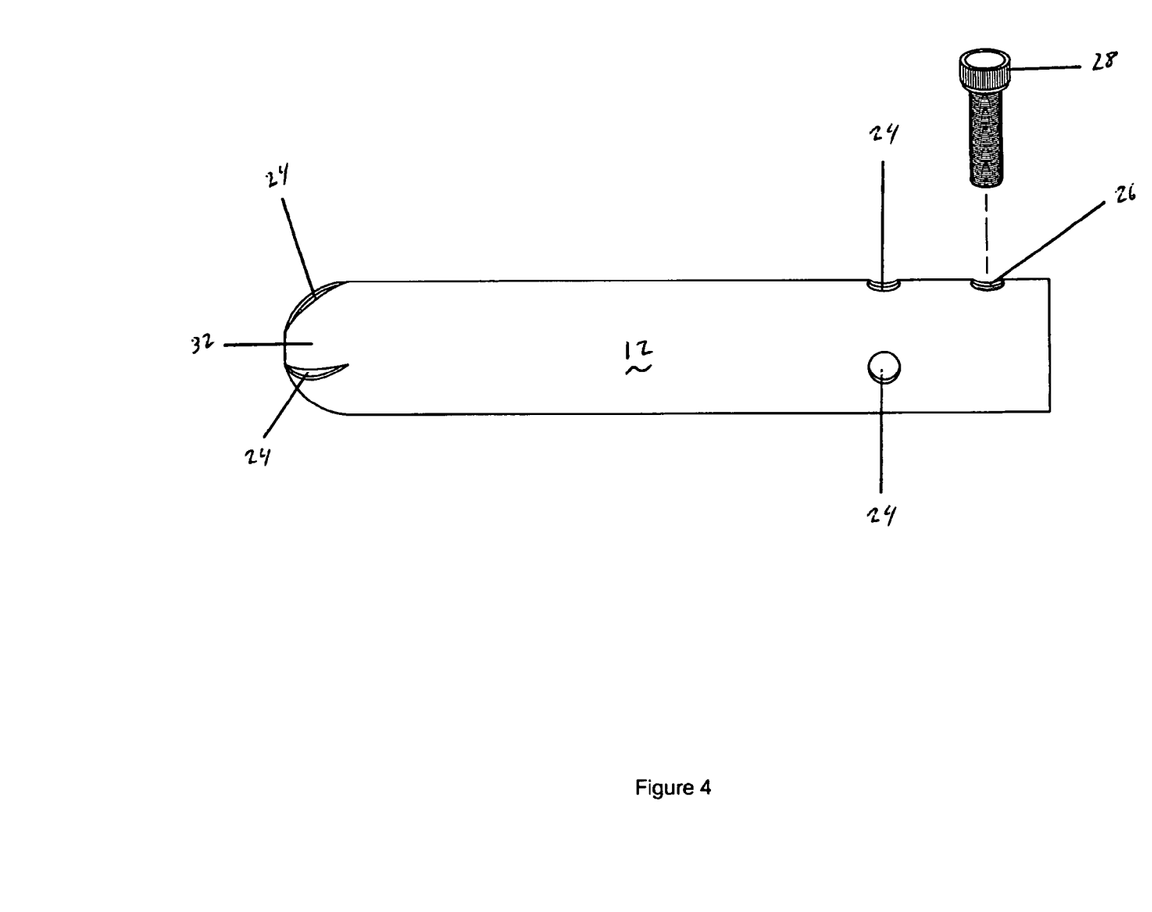
FIG. 4 of the drawings is a side elevational view of a food cooking apparatus showing, among other things, a threaded aperture and a fastener for releasably securing a substrate within the tubular body.

As is best shown in FIGS. 2A, 3B, and 4, second end 20 of body 12 is designed to be distal to a user and optionally comprises a plurality of tabs 32, which are bent to collectively form one or more venting apertures 24, such a four venting apertures which are optionally, circumferentially evenly spaced apart from one another. In one embodiment four tabs 32 are bent to collectively form five venting apertures, wherein four venting apertures are circumferentially evenly spaced apart from one another, and a fifth square venting aperture is collectively formed by the ends of the four tabs. Preferably the ends of tabs 32 emanate substantially perpendicular to outer surface 14 of tubular body 12.

Figure 2:
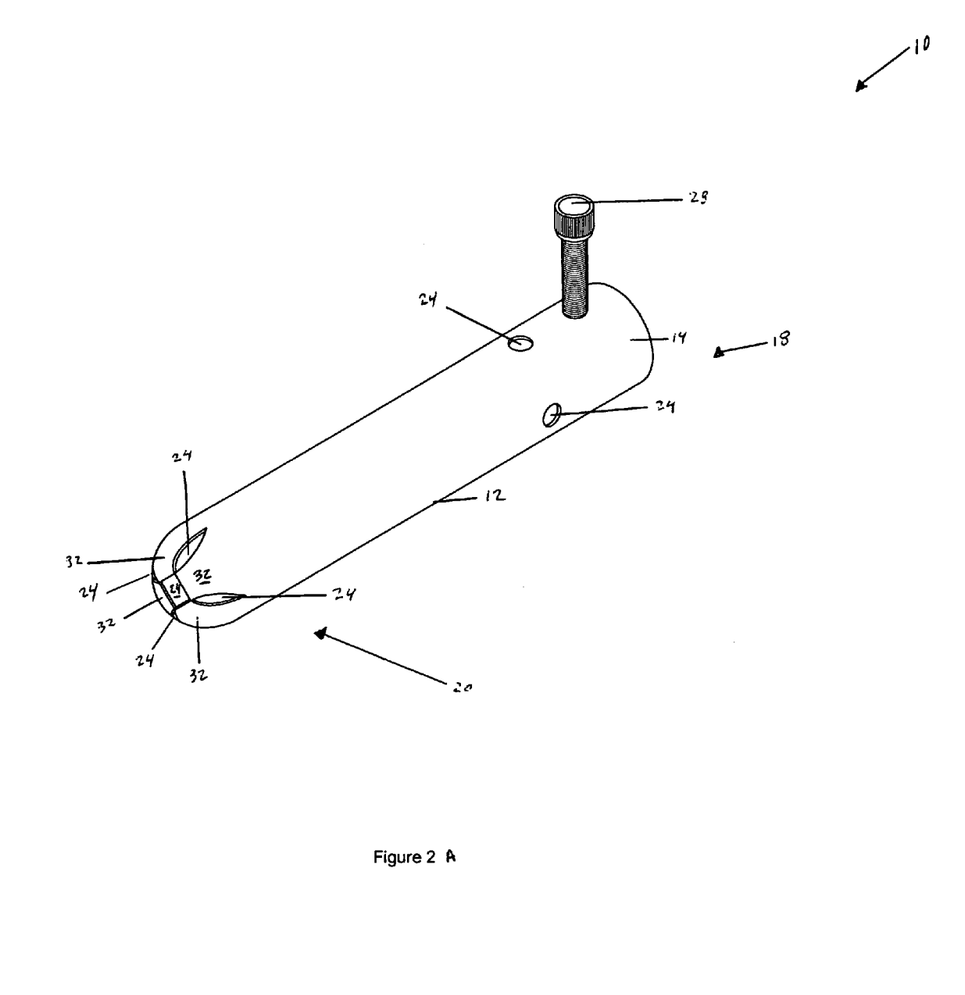
FIG. 2A of the drawings is a perspective view of a food cooking apparatus showing, among other things, a second end distal to a user comprising a plurality of tabs.
FIG. 2B of the drawings is a perspective view of a food cooking apparatus showing, among other things, a second end distal to a user comprising a washer.
FIG. 2C of the drawings is a perspective view of a food cooking apparatus showing, among other things, a second end distal to a user comprising an end cap.
Figure 2B:
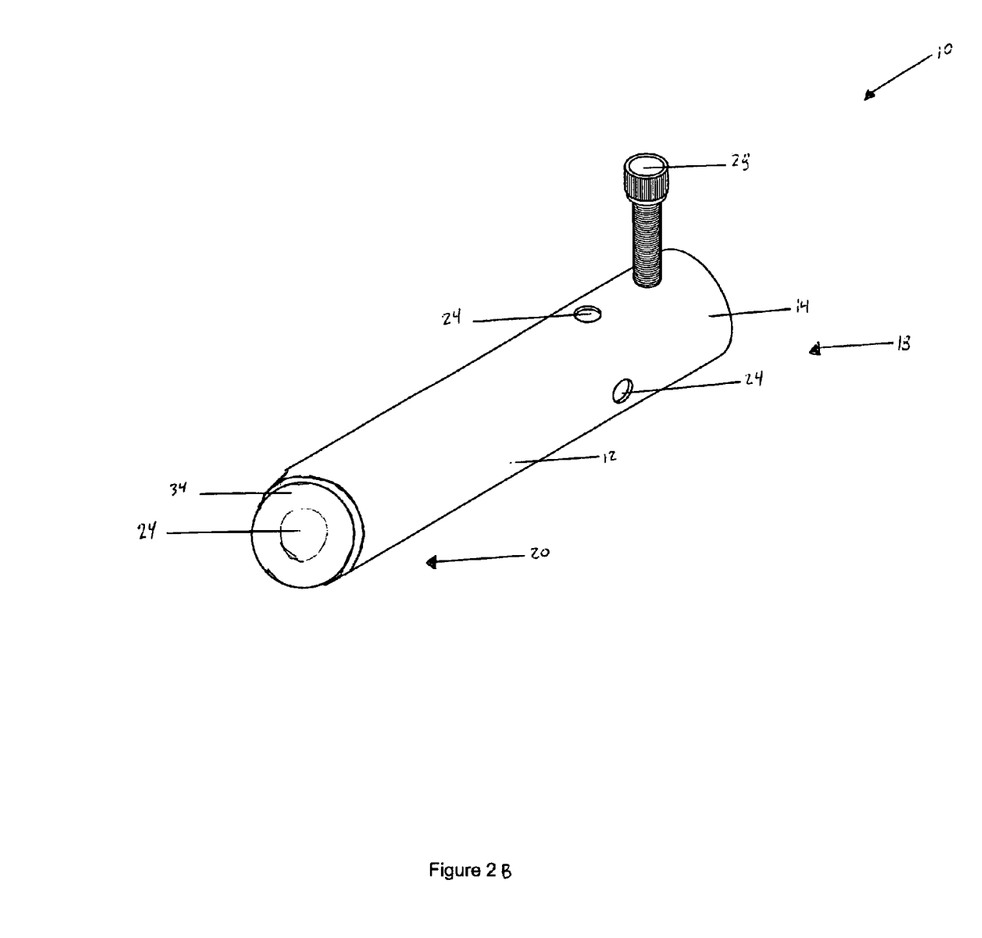

Referring now to FIGS. 2B and 2C, second end 20 of body 12 is designed to be distal to a user and may also optionally comprise washer 34 and/or end cap 36, respectively. Washer 34 and/or end cap 36 may be frictionally secured to body 12, adhesively secured to body 12, and/or threadedly secured to body 12. Washer 34 and/or end-cap 36 may optionally include one or more apertures.

In operation, uncooked dough is applied to at least a portion of outer surface 14 of food cooking apparatus 10. Food cooking apparatus 10 is then exposed to an open flame and/or coals, preferably with the assistance of substrate/branch 30 (See FIG. 5). Food cooking apparatus 10 may be rotated about its axis while being exposed to the heat of the open flame or coals. Once the dough is sufficiently cooked to the satisfaction of the user, the cooked pastry product is then removed from food cooking apparatus 10. Next, a hot dog is at least partially blanketed by the cooked pastry product and consumed with or without condiments. Alternatively, the cooked pastry product may be associated (e.g., coated, filled, dipped, etcetera) with pudding, jelly, sugar, and/or cinnamon.

The foregoing description merely explains and illustrates the invention and the invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. A food cooking apparatus for converting dough into a cooked pastry product over an open flame or coals which is configured to at least one of substantially blanket a hot dog or retain pudding, comprising:
    a tubular body, wherein the tubular body comprises:
    an outer surface and an inner surface;
    a first end proximate to a user, wherein the first end comprises an opening which is adapted to releasably receive a substrate for separating a user from an open flame or coals; and
    a second end distal to the user, wherein the second end includes a plurality of tabs, wherein the plurality of tabs consist of four tabs which are bent to collectively form five venting apertures, wherein four venting apertures are circumferentially evenly spaced apart from one another, and a fifth venting aperture is collectively formed by ends of the four tabs; wherein the tubular body is substantially cylindrical; wherein the first end of the tubular body comprises an annular opening; wherein the first end of the tubular body further comprises at least one venting aperture; wherein the first end of the tubular body further comprises four venting apertures which are circumferentially evenly spaced apart from one another; wherein at least a portion of the outer surface of the tubular body is associated with polytetrafluoroethylene.

2. The food cooking apparatus according to claim 1, wherein the at least one venting aperture consists of four circular venting apertures which are circumferentially evenly spaced apart from one another.

3. The food cooking apparatus according to claim 1, wherein the first end of the tubular body further comprises a plurality of venting apertures which are circumferentially evenly spaced apart from one another.

4. The food cooking apparatus according to claim 1, wherein the first end of the tubular body further comprises means for releasably securing a substrate to the food cooking apparatus.

5. The food cooking apparatus according to claim 1, wherein the first end of the tubular body further comprises a threaded aperture which is adapted to receive a fastener for securing a substrate to the food cooking apparatus.

6. The food cooking apparatus according to claim 1, wherein the fifth venting aperture consists of a square aperture.

7. The food cooking apparatus according to claim 1, wherein the tubular body is fabricated from a food grade material.

* * * * *